L. V. MILLER.
LASTING TACK PULLER.
APPLICATION FILED MAY 3, 1909.
Reissued June 24, 1913.
13,581.
2 SHEETS—SHEET 1.
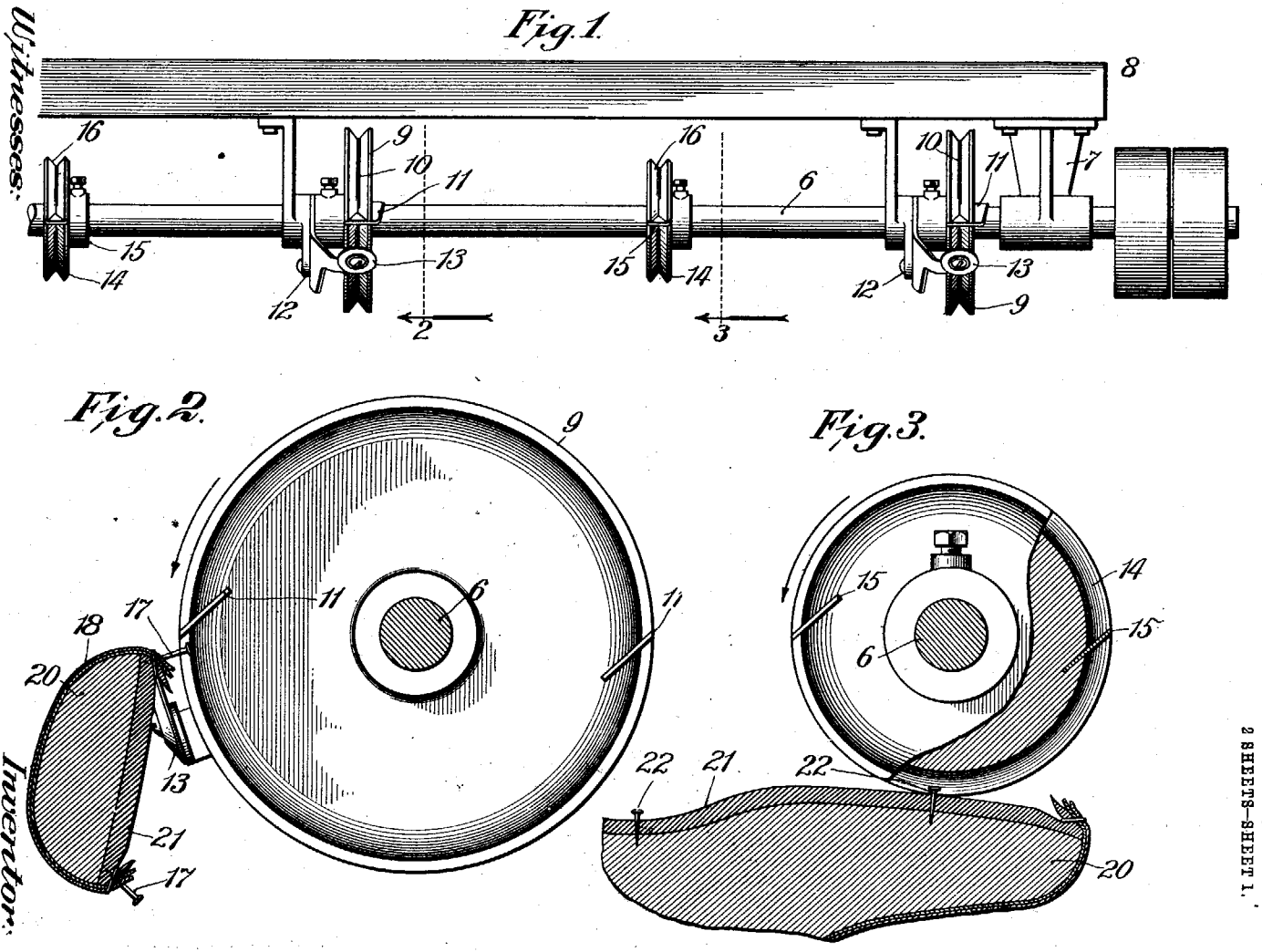
Witnesses:
E. C. Wurdemann
K. D. McPhail
Inventor:
Leslie V. Miller
by Phillips Van Everen & Fish
Attys.

L. V. MILLER.
LASTING TACK PULLER.
APPLICATION FILED MAY 3, 1909.
Reissued June 24, 1913.
13,581.
2 SHEETS—SHEET 2.
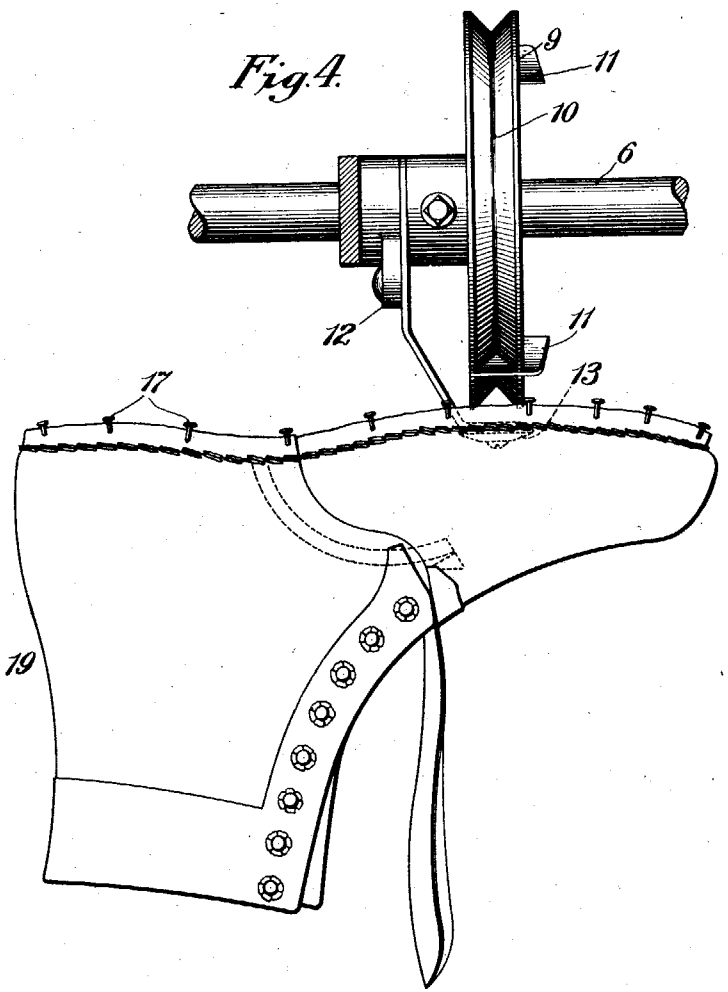
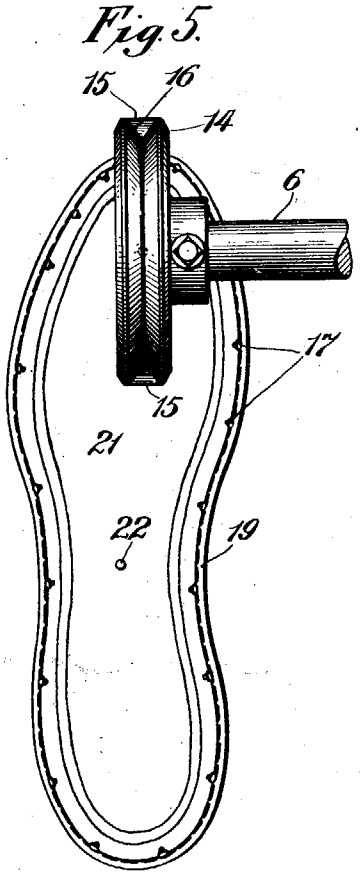
Witnesses:
E. C. Wurdeman
H. D. McPhail
Inventor:
Leslie V. Miller
by Phillips, Van Everen & Fish
Attys.

UNITED STATES PATENT OFFICE.

LESLIE V. MILLER, OF CHICAGO, ILLINOIS, ASSIGNOR TO UNITED SHOE MACHINERY COMPANY, OF PATERSON, NEW JERSEY, A CORPORATION OF NEW JERSEY.

LASTING-TACK PULLER.

13,581. Specification of Reissued Letters Patent. Reissued June 24, 1913.

Original No. 897,003, dated August 25, 1908, Serial No. 395,087. Application for reissue filed May 3, 1909. Serial No. 493,761.

*To all whom it may concern:*

Be it known that I, LESLIE V. MILLER, a citizen of the United States, residing at Chicago, in the county of Cook and State of Illinois, have invented certain new and useful Improvements in Lasting-Tack Pullers; and I do hereby declare the following to be a full, clear, and exact description of the invention, such as will enable others skilled in the art to which it appertains to make and use the same.

My invention relates to an improved construction of machine for pulling out of lasted shoes and boots the tacks employed for temporarily fastening the upper to the sole preparatory to sewing the parts together; and it relates particularly to an improvement in the type of machine for the purpose employing a rotary wheel adapted to have the lasted shoe moved relative to its periphery to present the tacks to be extracted to pullers projecting from a side of the wheel.

In the accompanying drawings, Figure 1 is a view in front elevation showing a plurality of my improved devices on a common rotary shaft; Fig. 2, an enlarged section taken at the line 2 on Fig. 1 and viewed in the direction of the arrow, showing a lasted shoe, in section, undergoing extraction of the tacks that temporarily fasten the upper to the sole; Fig. 3, a similar section taken at the line 3 on Fig. 1 and viewed in the direction of the arrow, showing the shoe undergoing extraction of the tacks which are driven into the last through the shoe-sole; Fig. 4, a plan view of the showing made in Fig. 2, and Fig. 5, a similar view of the showing made in Fig. 3.

In its preferred embodiment my improved device involves two tack-pulling wheels of relatively larger and smaller diameters on a common rotary shaft, one being adapted for extracting the projecting tacks which fasten the upper to the sole, and the smaller for extracting the tacks that fasten the sole and counter to the last.

On a pulley-equipped shaft 6 of any desired length, journaled in suitable bearings, one of which is represented at 7 (Fig. 1) as depending from a table, bench, or other support, indicated at 8, is secured to rotate with it a wheel 9, which is preferably provided with a circumferentially grooved periphery, the groove 10 shown being of V-shape in cross-section; and similar tack-extracting wipers 11 are shown in the form of blades let rigidly into the periphery of the wheel at diametrically opposite points thereof, to extend across it and project beyond its outer face. Only one, or more than two, of these blades may, however, be provided on the wheel. Adjacent to the wheel 9 there projects from about the shaft a stationary bent arm 12 carrying on its outer end a head, shown as a disk 13 journaled on the arm-end to extend over and adjacent to the periphery of the wheel and afford a guide.

On the shaft, a suitable distance from the wheel 9, is secured a wheel 14 in all particulars like the wheel 9 except that it is smaller in diameter and that the similar blades 15 which are rigidly let into the periphery to extend across the circumferential groove 16 therein, do not project beyond a face of the wheel.

To operate the device for extracting the tacks 17 which fasten the upper 18 of a shoe 19 on a last 20 to the sole 21, and the heads of which project in series about the inturned edge of the upper, the operator presents the shoe, as represented in Fig. 4, to the periphery of the rotary wheel 9, by applying the usual channel about the shoe-sole to the rotary disk 13, the edge of which thus enters the channel, causing it to guide the operator in turning the shoe, cross wise of the periphery of the wheel, on the disk to present the tacks successively to the path of the projecting ends of the blades. In originally placing the shoe a tack 17 may be abutted against the outer side of the wheel, as represented in Fig. 4, and when the blade 11, in the rotation of the wheel, encounters that tack it extracts it by wiping it out. Then the operator turns the shoe to bring the next succeeding tack to abut against the wheel-side and to be extracted in the same way by encounter with it of a blade 11; and so on, until all the tacks 17 have been extracted in succession, the wheel-side affording a stop for guidance of the operator in moving the shoe to bring the tacks successively into the path of the extracting blade or blades. While the guide 13 is a desirable adjunct, it may be dispensed with; and the groove 10 in the wheel 9 is particularly useful in extracting the counter and sole tacks, as hereinafter described with reference to the wheel 14, when the wheel 9 is used, as it may be, for that purpose, this groove being further useful in reducing to the minimum the friction of the shoe against the periphery of the wheel in moving it across the same. As will be observed, the blades 11 not only extract the tacks presented to them, but in doing so also wipe down the free edge portion of the upper.

To pull the tacks 22 that are driven into the last through the sole 21, the operator applies the sole at a tack therein to the grooved periphery of the wheel 14, with sufficient pressure to cause the sole to warp, at the point of application, into the groove and thereby slightly protrude the head of the tack, if it be fully driven, into the path of the blade 15, which, when it encounters the tack, will extract it; and the same operation may be similarly performed on the counter of the shoe to extract the tack usually driven through it into the last, though none is shown in the drawing.

By providing the two blade-equipped wheels 9 and 14 in suitably relative position on one and the same rotary shaft, they form parts of the same machine, enabling the operator to use the parts in succession, as required, with perfect convenience. Moreover, my improved construction enables any desired number of the machines to be applied on one sufficiently long shaft 6, as is represented of two of the machines in Fig. 1, with the advantages of economy in space and power, and convenience of simultaneous access to a plurality of operators.

What I claim as new, and desire to secure by Letters Patent, is:—

1. In a tack-pulling machine for lasted shoes, the combination of a rotary shaft, a wheel supported on said shaft to adapt a lasted shoe to be moved in a path lengthwise of its series of side-tacks across the periphery of the wheel, and an extractor-blade projecting from a side of said wheel to rotate therewith in a plane intersecting said path for the purpose set forth.

2. In a tack-pulling machine for lasted shoes, the combination of a rotary shaft, a wheel on said shaft having a circumferentially grooved periphery, and an extractor blade on said wheel extending crosswise of its periphery, for the purpose set forth.

3. In a tack-pulling machine for lasted shoes, the combination of a rotary shaft, a peripherally grooved wheel on said shaft, an extractor-blade extending across the periphery of the wheel and projecting beyond a side thereof, and a guide supported to extend adjacent to said periphery, for the purpose set forth.

4. A tack pulling machine for lasted shoes, having, in combination, a rotary hub having its periphery provided with one or more projecting tack extracting wiper blades, and means for engaging the shoe laterally of the blades arranged to permit the surface of the shoe to be protruded into the path of the blades.

5. A tack pulling machine for lasted shoes, having, in combination, a rotary wheel provided with a tack extracting wiper blade shaped and arranged to dig into the sole and extract sole tacks from a shoe, and means against which the shoe is held arranged to permit the surface of the sole to be protruded into the path of the blade, substantially as described.

In testimony whereof I affix my signature, in presence of two witnesses.

LESLIE V. MILLER.

Witnesses:
THEODORE SMITH,
EDWARD A. FARGO.

Copies of this patent may be obtained for five cents each, by addressing the "Commissioner of Patents, Washington, D. C."